(12) United States Patent
Ohara

(10) Patent No.: US 12,032,066 B2
(45) Date of Patent: Jul. 9, 2024

(54) RECOGNITION DEVICE AND METHOD

(71) Applicant: HONDA MOTOR CO., LTD., Tokyo (JP)

(72) Inventor: Kazuma Ohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 851 days.

(21) Appl. No.: 17/146,568

(22) Filed: Jan. 12, 2021

(65) Prior Publication Data

US 2021/0231811 A1   Jul. 29, 2021

(30) Foreign Application Priority Data

Jan. 29, 2020   (JP) ................... 2020-012375

(51) Int. Cl.
| | |
|---|---|
| *G01C 3/08* | (2006.01) |
| *G01S 7/48* | (2006.01) |
| *G01S 7/481* | (2006.01) |
| *G01S 17/08* | (2006.01) |
| *G01S 17/89* | (2020.01) |

(52) U.S. Cl.
CPC ............ *G01S 17/89* (2013.01); *G01S 7/4808* (2013.01); *G01S 7/4811* (2013.01); *G01S 17/08* (2013.01); *G01S 7/4817* (2013.01)

(58) Field of Classification Search
CPC ........ G01S 17/89; G01S 17/08; G01S 7/4804; G01S 7/4811; G01S 7/4817
See application file for complete search history.

(56) References Cited

U.S. PATENT DOCUMENTS 6,317,202 B1 * 11/2001 Hosokawa ............. G01S 17/42
180/169
2011/0222732 A1   9/2011 Higuchi et al.
(Continued)

FOREIGN PATENT DOCUMENTS

| CN | 102132335 | 7/2011 |
|---|---|---|
| CN | 108983218 | 12/2018 |

(Continued)

OTHER PUBLICATIONS

Chinese Office Action for Chinese Patent Application No. 202110039386.7 mailed Oct. 25, 2023.
(Continued)

*Primary Examiner* — Mark Hellner
(74) *Attorney, Agent, or Firm* — Amin, Turocy & Watson, LLP

(57) ABSTRACT

A recognition device includes: an acquirer configured to be connected to an object detection sensor which is mounted in a vehicle and is capable of changing a detection direction of each of upper, lower, right, and left directions and to acquire a detection result including 3-dimensional positional information regarding detection points from the object detection sensor; and a determiner configured to determine whether a point of interest among the detection points is a detection point at which a road surface is detected, based on a relation between the point of interest and a reference point at which a detection direction of the upper and lower directions is further downward than at the point of interest and configured to output a determination result.

6 Claims, 9 Drawing Sheets

(56) References Cited

U.S. PATENT DOCUMENTS

| | | | |
|---|---|---|---|
| 2011/0248880 A1* | 10/2011 | Miyahara | G01S 7/4802 |
| | | | 342/54 |
| 2015/0336546 A1 | 11/2015 | Al-Zahrani | |
| 2016/0195615 A1 | 7/2016 | Tobeta et al. | |
| 2018/0348360 A1 | 12/2018 | Wang et al. | |
| 2021/0041565 A1 | 2/2021 | Murayama et al. | |

FOREIGN PATENT DOCUMENTS

| | | | | |
|---|---|---|---|---|
| JP | 2006-276023 | | 10/2006 | |
| JP | 2011-232325 | | 11/2011 | |
| JP | 2011232325 A | * | 11/2011 | G01S 17/42 |
| JP | 2012-225806 | | 11/2012 | |
| JP | 2016044969 A | * | 4/2016 | G08G 1/16 |
| JP | 2016-125925 | | 7/2016 | |
| JP | 2017-223511 | | 12/2017 | |
| WO | 2019/244334 | | 12/2019 | |

OTHER PUBLICATIONS

Japanese Office Action for Japanese Patent Application No. 2020-012375 mailed Oct. 3, 2023.

Japanese Notice of Allowance for Japanese Patent Application No. 2020-012375 mailed Dec. 22, 2023.

* cited by examiner

| LAYER | rmin |
|-------|------|
| L0 | 2[m] |
| L1 | 4[m] |
| ... | ... |
| Lk | 150[m] |
| Lk+1 | - |
| ... | ... |
| Ln | - |

RECOGNITION DEVICE AND METHOD

CROSS-REFERENCE TO RELATED APPLICATION

Priority is claimed on Japanese Patent Application No. 2020-012375, filed Jan. 29, 2020, the content of which is incorporated herein by reference.

BACKGROUND

Field of the Invention

The present invention relates to a recognition device and a method.

Description of Related Art

LIDARs for acquiring 3-dimensional point groups are known. In such LIDARs, a resolution in the vertical direction is lower than a resolution in the horizontal direction. For example, in the vertical direction, scanning is performed on 4 to 128 lines (corresponding to a "layer" to be described below) and a resolution is lower than when an image of an in-vehicle camera of 1000 or more lines is acquired. Various processes of recognizing road surfaces based on 3-dimensinal point groups have been devised.

For example, an invention of a device that detects a ground surface and a wall surface by calculating flatness and a normal direction of each 3-dimensional point group obtained by LIDAR and performing clustering using similarity of 3-dimensional points in the normal direction was disclosed (Japanese Unexamined Patent Application, First Publication No. 2017-223511).

SUMMARY

In the technology of the related art, it takes time to perform a process of calculating flatness or a normal direction and a clustering process. Thus, a processing load may increase in some cases. Further, since there are gradients in road surfaces, it is necessary to lower sensitivity of the clustering process to some extent. As a result, accuracy may be insufficient. For example, 3-dimensional objects such as fallen objects which have low heights are erroneously recognized as road surfaces.

The present invention has been devised in view of such circumstances and an objective of the present invention is to provide a recognition device and a method capable of reducing a processing load while maintaining accuracy.

The recognition device and a method according to aspects of the present invention are configured as follows.

(1) According to an aspect of the present invention, a recognition device includes: an acquirer configured to be connected to an object detection sensor which is mounted in a vehicle and is capable of changing a detection direction of each of upper, lower, right, and left directions and to acquire a detection result including 3-dimensional positional information regarding detection points from the object detection sensor; and a determiner configured to determine whether a point of interest among the detection points is a detection point at which a road surface is detected, based on a relation between the point of interest and a reference point at which a detection direction of the upper and lower directions is further downward than at the point of interest and configured to output a determination result.

(2) In the recognition device according to the aspect of (1), the determiner may calculate a reference distance based on a distance between the object detection sensor and the reference point, a difference between the point of interest and the detection direction of the reference point, and a set road surface gradient, may determine that the point of interest is the detection point at which the road surface is detected when the distance between the object detection sensor and the point of interest is equal to or greater than the reference distance, and may determine that the point of interest is not the detection point at which the road surface is detected when the distance between the object detection sensor and the point of interest is less than the reference distance.

(3) In the recognition device according to the aspect of (1), the determiner may determine that the point of interest is the detection point at which the road surface is detected when an angle formed with respect to a set horizontal plane of a straight line connecting the point of interest to the reference point is equal to or less than a set road surface gradient, and may determine that the point of interest is not the detection point at which the road surface is detected when the angle formed with respect to the set horizontal plane of the straight line connecting the point of interest to the reference point is greater than the set road surface gradient.

(4) In the recognition device according to the aspect of (2), the determiner may treat a distance between the object detection sensor and the point of interest in a 3-dimensional space as the distance between the object detection sensor and the point of interest, and may treat a distance between the object detection sensor and the reference point in a 3-dimensional space as the distance between the object detection sensor and the reference point.

(5) In the recognition device according to the aspect of (2), the determiner may treat a distance between the object detection sensor and the point of interest in a 2-dimensional space projected from a 3-dimensional space between the object detection sensor and the point of interest as the distance between the object detection sensor and the point of interest, and may treat a distance between the object detection sensor and the reference point in a 2-dimensional space projected from a 3-dimensional space as the distance between the object detection sensor and the reference point.

(6) In the recognition device according to the aspect of (1), the determiner may perform a first-stage determination process of determining that the point of interest is not the detection point at which the road surface is detected when the distance between the object detection sensor and the point of interest is less than a distance lower limit determined based on the detection direction of the upper and lower directions of the point of interest, the set road surface gradient, and a position at which the object detection sensor is mounted, and may perform a second-stage determination process of determining whether the point of interest is the detection point at which the road surface is detected, based on a relation between the distance between the object detection sensor and the point of interest and the distance between the object detections sensor and the reference point when it is determined in the first-stage determination process that the point of interest is not the detection point at which the road surface is detected.

(7) According to another aspect of the present invention, a recognition device includes: an acquirer configured to be connected to an object detection sensor which is mounted in a vehicle and is capable of changing a detection direction of each of upper, lower, right, and left directions and acquires a detection result including 3-dimensional positional information regarding detection points from the object detection sensor; and a determiner configured to determine that a point of interest is not a detection point at which a road surface is detected when a distance between the object detection sensor and a point of interest included in the detection points is less than a distance lower limit determined based on the detection direction of the upper and lower directions of the point of interest, a set road surface gradient, and a position at which the object detection sensor is mounted and configured to output a determination result.

(8) According to still another aspect of the present invention, a method causes a computer connected to an object detection sensor which is mounted in a vehicle and is capable of changing a detection direction of each of upper, lower, right, and left directions: to acquire a detection result including 3-dimensional positional information regarding detection points from the object detection sensor; and to determine whether a point of interest among the detection points is a detection point at which a road surface is detected, based on a relation between the point of interest and a reference point at which a detection direction of the upper and lower directions is further downward than at the point of interest and to output a determination result and to output a determination result.

(9) According to still another aspect of the present invention, a method causes a computer connected to an object detection sensor which is mounted in a vehicle and is capable of changing a detection direction of each of upper, lower, right, and left directions: to acquire a detection result including 3-dimensional positional information regarding detection points from the object detection sensor; and to determine that a point of interest is not a detection point at which a road surface is detected when a distance between the object detection sensor and a point of interest included in the detection points is less than a distance lower limit determined based on the detection direction of the upper and lower directions of the point of interest, a set road surface gradient, and a position at which the object detection sensor is mounted and to output a determination result.

According to the aspects of (1) to (9), it is possible to reduce a processing load while maintaining accuracy.

BRIEF DESCRIPTION OF THE DRAWINGS

FIG. 4 is a diagram illustrating an example of content of a distance lower limit table for each layer used by the first determiner.

DESCRIPTION OF EMBODIMENTS

Hereinafter, embodiments of a recognition device and a method according to the present invention will be described with reference to the drawings.

First Embodiment

Figure 1:
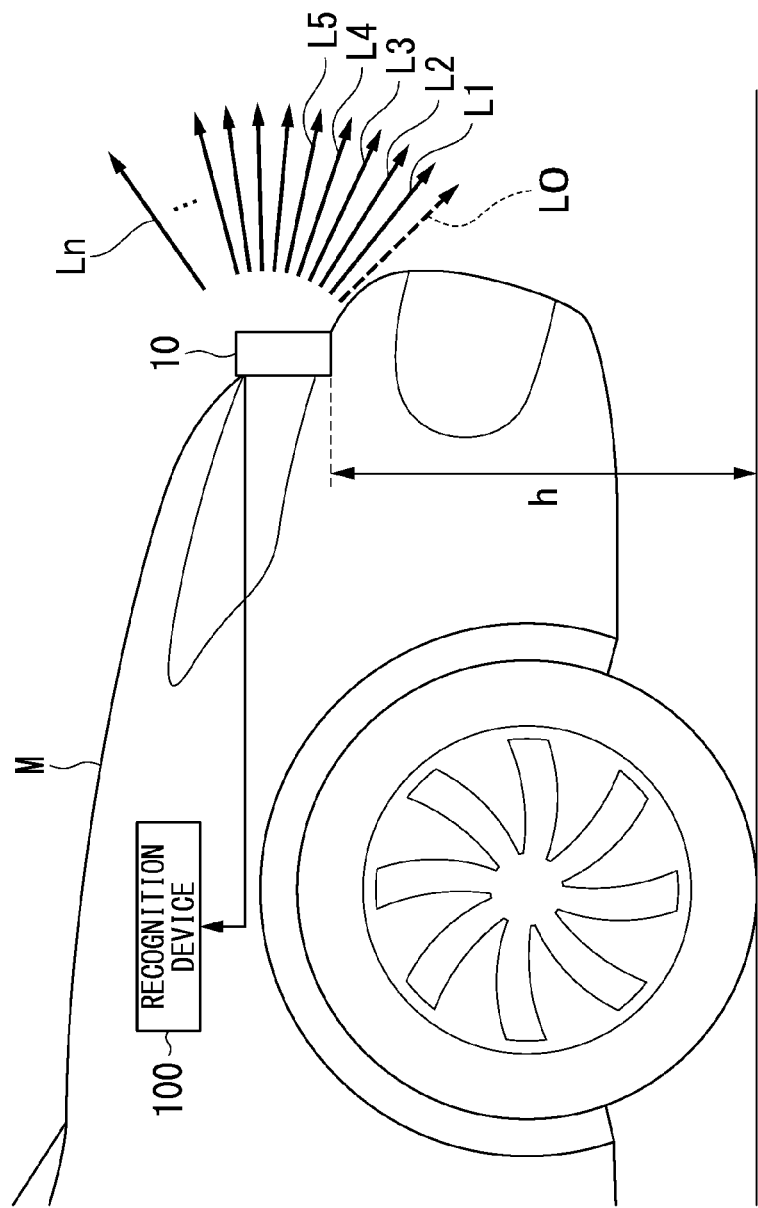
FIG. 1 is a diagram illustrating an example of positions at which a LIDAR and a recognition device are installed.

FIG. 1 is a diagram illustrating an example of positions at which a light detection and ranging (LIDAR) 10 and a recognition device 100 are installed. The LIDAR 10 is an example of an object detection sensor. The LIDAR 10 is mounted at a position for looking out the vehicle M in any direction. In the example of FIG. 1, the LIDAR 10 is mounted at a position of a height of h from a road surface on a front end of the vehicle M. The height h is, for example, about tens of [cm]. A combination of the LIDAR 10 and the recognition device 100 is an example of a "recognition system."

The LIDAR 10 detects a distance to a detection point which is on the contour of a target by radiating light, detecting reflected light, and measuring a time T from the radiation to the detection. The LIDAR 10 can change a radiation direction of the light to both an elevation angle or a depression angle (a radiation direction of the upper and lower directions) and an azimuth angle (a radiation direction in the horizontal direction). The LIDAR 10 repeatedly performs, for example, an operation of performing scanning while fixing the radiation direction of the upper and lower directions and changing the radiation direction in the horizontal direction, changing the radiation direction of the upper and lower directions, and performing scanning while fixing the radiation direction of the upper and lower directions at the change angle and changing the radiation direction in the horizontal direction. Hereinafter, the radiation direction of the upper and lower directions is referred to as a "layer," scanning performed while fixing the layer and changing the radiation direction in the horizontal direction is referred to as a "cycle," executing this cycle by the number of layers is referred to as a "scan," and the radiation direction in the horizontal direction is referred to as an "azimuth." The layer is identification information of the radiation direction and also indicates an angle. The layer is set as a finite number of, for example, L0 to Ln (where n is a natural number). For example, the layer is changed discontinuously in the order of L0→L4→L2→L5→L1, . . . with respect to an angle without interference of detection of light radiated in a previous cycle in a present cycle. The present invention is not limited thereto and the layer may be changed continuously with respect to an angle.

The LIDAR 10 outputs, for example, a plurality of data sets (which is an example of "a detection result including 3-dimensional positional information of a detection point") which each include {layer, azimuth, time T, intensity P of detected reflected light} to the recognition device 100. The recognition device 100 is installed in any portion in the vehicle M.

Figure 2:
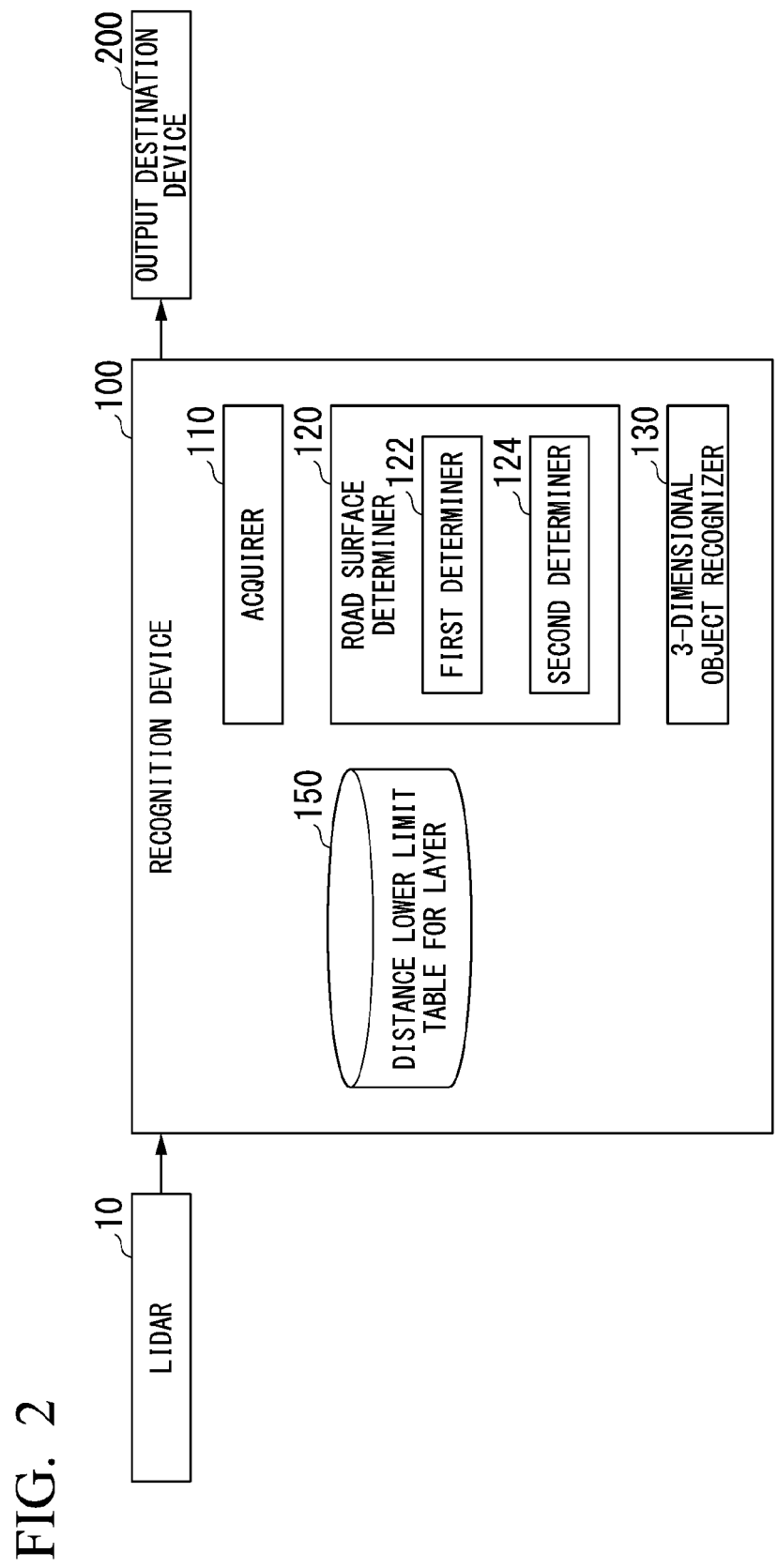
FIG. 2 is a diagram illustrating an internal configuration or the like of the recognition device.

FIG. 2 is a diagram illustrating an internal configuration or the like of the recognition device 100. The recognition device 100 outputs a recognition result or the like to the output destination device 200. The recognition result includes, for example, a road surface region ascertained from the data set input from the LIDAR 10 or presence of a target estimated in such a way that detection points determined not to be a road surface are arranged. The output destination device 200 is any of various driving support devices, automated driving control devices, display devices, speakers, and the like. As described in a second embodiment to be described below, the recognition device 100 and the output destination device 200 may be integrated.

The recognition device 100 includes, for example, an acquirer 110, a road surface determiner 120, and a 3-dimensional object recognizer 130. The road surface determiner includes a first determiner 122 and a second determiner 124. These constituent elements are realized, for example, by causing a hardware processor such as a central processing unit (CPU) to execute a program (software). Some or all of these constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as a hard disk drive (HDD) or a flash memory or may be stored in a detachably mountable storage medium (a non-transitory storage medium) such as a DVD, a CD-ROM, or the like so that the storage medium is mounted on a drive device to be installed. The recognition device 100 retains a distance lower limit table 150 for each layer in a storage device such as an HDD, a flash memory, a ROM, or a RAM.

The acquirer 110 acquires the data sets from the LIDAR 10 and stores the data sets in a memory (not illustrated).

The road surface determiner 120 calculates a distance between the LIDAR 10 and a detection point based on the time T in the data set and also determines whether each detection point is a detection point at which a road surface is detected. The LIDAR 10 may have the function of calculating the distance between the LIDAR 10 and the detection point. In the following description, a detection point at which it is determined whether there is a road surface is referred to as a point of interest. The road surface determiner 120 sequentially selects a point of interest from a plurality of detection points and performs the following process.

The first determiner 122 performs the first-stage determination process. The first determiner 122 determines whether a distance r between the LIDAR 10 and the point of interest is less than a distance lower limit rmin determined based on a layer (a detection direction of the upper and lower directions) θ of the point of interest, a set road surface gradient ψmax, and a height h indicating a position at which the LIDAR 10 is mounted, and determines that the point of interest is the detection point at which the road surface is detected When the distance r is less than the distance lower limit rmin. The set road surface gradient ψmax is, for example, a maximum gradient in an ascending direction on a normal road and is set to, for example, about several degrees (more specifically, about 5 degrees).

Figure 3:
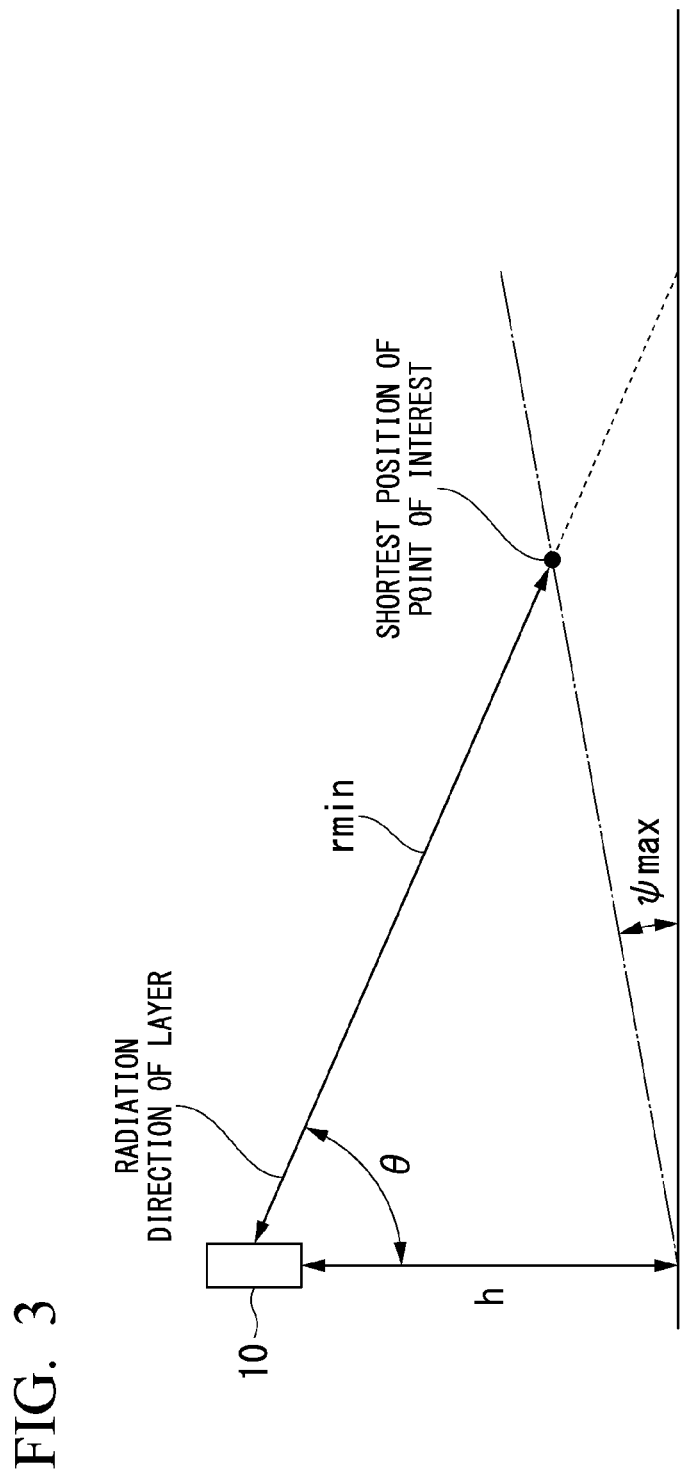
FIG. 3 is a diagram illustrating a principle of a process performed by a first determiner.

FIG. 3 is a diagram illustrating a principle of a process performed by the first determiner 122. The distance r to the point of interest is assumed to be detected by radiating light to a layer with an angle θ with respect to the vertical direction. At this time, when the vehicle M is assumed to be on an uphill with the set road surface gradient ψmax and it is detected that the point of interest is a point which has been detected as a road surface, the distance r must be equal to or greater than the distance lower limit rmin. The distance lower limit rmin is obtained based on the sine theorem by Expressions (1) and (2). Here, the size of the LIDAR 10 in the height direction can be ignored. However, when the size of the LIDAR 10 in the height direction is taken into consideration, a distance between a bottom portion and a radiator of the LIDAR 10 may be added to the height h. Alternatively, unlike FIGS. 1 and 3, the height h may be obtained using the radiator of the LIDAR 10 as a reference.

$$r\text{min}/\sin(90°-\psi\text{max})=h/\sin(90°-\theta+\psi\text{max}) \tag{1}$$

$$r\text{min}=h\times\cos(\psi\text{max})/\cos(\theta-\psi\text{max}) \tag{2}$$

Figure 4:
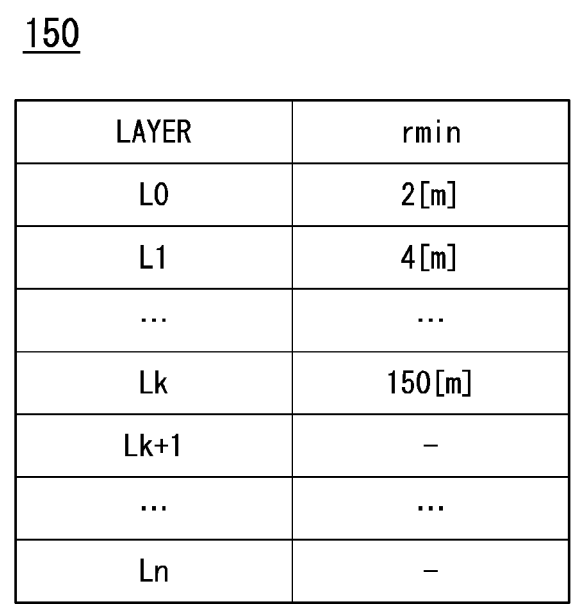

When the distance r to the point of interest is less than the distance lower limit rmin, the first determiner 122 determines that the point of interest is not the detection point at which the road surface is detected. Here, since the height h and the set road surface gradient ψmax are known values and do not change, the distance lower limit rmin can be uniquely obtained when the angle θ is given. Therefore, the first determiner 122 may retain a table of the distance lower limit rmin for each layer (angle θ) without performing calculation of Expression (2) in each process and may obtain the distance lower limit rmin with reference to the table when the layer is given. FIG. 4 is a diagram illustrating an example of content of the distance lower limit table 150 for each layer used by the first determiner 122. In the drawing, a layer Lk is a layer oriented further downwards from the horizontal direction and furthest upwards. Since layers Lk+1 and Ln are oriented upwards from the horizontal direction between, these layers are not targets processed by the first determiner 122. The numerical values illustrated in the drawing are simply exemplary and do not indicate characteristics of a specific LIDAR.

The second determiner 124 determines whether a point of interest determined "not to be a detection point at which a road surface is detected" by the first determiner 122 is a detection point at which the road surface is detected based on a relation between the point of interest and a reference point. The reference point is a detection point further downward than the point of interest in the detection direction of the upper and lower directions and is more specifically a detection point at which a detection direction of the right and left directions is the same as at the point of interest. For example, the reference point is a detection point which includes a layer in a direction lower by one stage (for example, L1 or the like with respect to L2) in the radiation direction as an element with respect to the point of interest and which corresponds to a data set that has the same azimuth. The reference point may be a detection point which includes a layer in a direction lower by two or more stages in the radiation direction as an element with respect to the point of interest and which corresponds to a data set that has the same azimuth. When a scanning speed of the LIDAR 10 is not sufficiently faster than a travel speed of the vehicle M, the position of the point of interest or the reference point may be corrected based on a distance by which the vehicle M has traveled from detection of one of the point of interest and the reference point to detection of the other. A correction amount can be derived using a trigonometric function based on the position at which the LIDAR 10 is mounted and the layers of the point of interest and the reference point. When the scanning speed of the LIDAR 10 is sufficiently faster than the travel speed of the vehicle M, the correction amount may be ignored.

Figure 5:
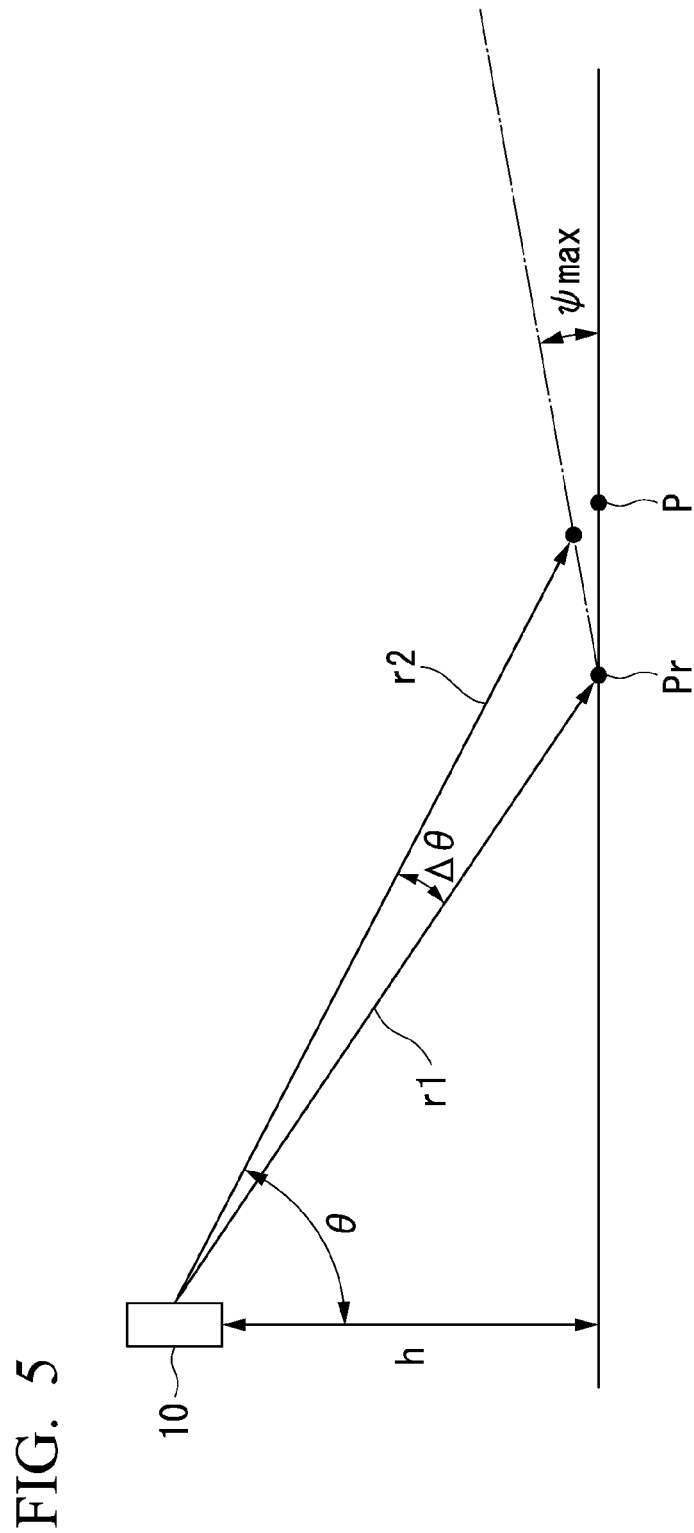
FIG. 5 is a diagram illustrating a principle of a process performed by a second determiner.

FIG. 5 is a diagram illustrating a principle of a process performed by the second determiner 124. In the first embodiment, the second determiner 124 calculates a reference distance r2 based on a distance r1 between the LIDAR 10 and a reference point Pr, a layer (a detection direction of the upper and lower directions) θ of a point of interest P, a difference Δθ in the detection direction between the point of interest P and the reference point Pr, and the set road surface gradient ψmax. When the distance r between the LIDAR 10 and the point of interest P is less than the reference distance r2, the point of interest P is determined to be the detection point at which the road surface is detected. A set road surface gradient ψmax (a first set road surface gradient) used by the first determiner 122 and a set road surface gradient ψmax (a second set road surface gradient) used by the second determiner 124 may be the same value or may be different values (for example, the gradient used by the second determiner 124 is slightly shorter). The reference distance r2 is obtained based on the sine theorem by Expression (3). For example, when a point of interest of a certain layer is determined "not to be the detection point at which the road surface is detected," the second determiner 124 determines that a detection point at which an azimuth in a layer oriented upwards from the detection point is the same is "not the detection point at which the road surface is detected" regardless of the above. Thus, for example, when there is an obstacle that has a flat upper surface, it is possible to inhibit the upper surface from being erroneously recognized as a road surface. A specific description will be made in FIG. 7.

$$r2 = r1 \times \sin(\psi max - \theta) / \sin(\psi max - \theta - \Delta\theta) \quad (3)$$

Figure 6:
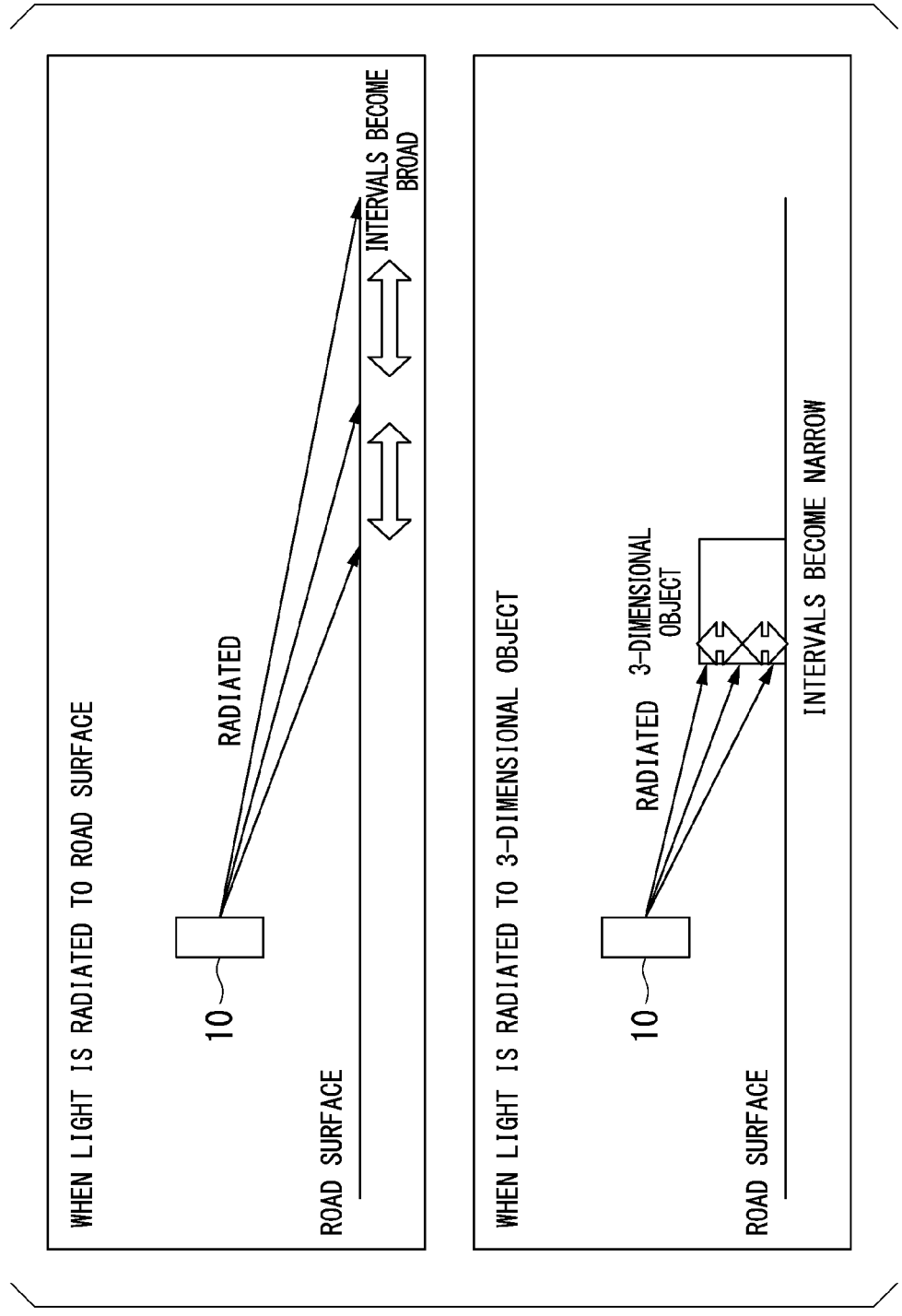
FIG. 6 is a diagram illustrating an aspect in which the recognition device detects a road surface with high accuracy.

FIG. 6 is a diagram illustrating an aspect in which the recognition device 100 detects a road surface with high accuracy. As illustrated in the upper drawing of FIG. 6, when the LIDAR 10 radiates light to a road surface, intervals of detection points between layers become broad. In contrast, as illustrated in the lower drawing of FIG. 6, when the LIDAR 10 radiates light to a 3-dimensional object, intervals of detection points between layers become narrower than in the case of the road surface. Then, by using the set road surface gradient ψmax which is a maximum gradient in an ascending direction on a normal road as a threshold (rmin or r2) serving as a boundary line of the determination, it is possible to reduce a likelihood of determining that the road surface is not a road surface because the detection point on an uphill road becomes close to the LIDAR 10. Thus, it is possible to determine whether the detection point is a detection point at which the road surface is detected with high accuracy.

Here, the set road surface gradient ψmax which is a fixed value has been described. The road surface determiner 120 may acquire an actual gradient of a road on which the vehicle M is traveling using map information (a navigation system), a GPS receiver, a communication device, a gradient sensor, or the like and may change the set road surface gradient ψmax based on the acquired gradient. For example, when the position of the vehicle M obtained from the GPS receiver and a change in the position are applied to the map information, a road (link) on which the vehicle M is traveling is specified, and a gradient is associated with the road, it is possible to acquire the gradient. For example, when the acquired gradient is downhill, the road surface determiner 120 decreases the set road surface gradient ψmax. When the gradient is equal to or greater than a threshold on an uphill road, the road surface determiner 120 increases the set road surface gradient ψmax.

As described above, based on whether the distance r to the point of interest P in a 3-dimensional space equal to or greater than the reference distance r2 in the same 3-dimensional space, the second determiner 124 determines whether the point of interest P is the detection point at which the road surface is detected. Instead of this, the second determiner 124 may determine whether the point of interest P is the detection point at which the road surface is detected based on whether a distance r # to the point of interest P in the case of projection of a detection point in a 3-dimensional space to a set horizontal plane is equal to or greater than a reference distance r2 # on the same set horizontal plane. The set horizontal plane is a plane that includes a point displaced by the height h from the position of the LIDAR 10 (a point on a road surface when viewed from the LIDAR 10) and extends in a direction set as a horizontal plane using a posture of the LIDAR 10 as a reference. The distance r # and the reference distance r2 #, which are expressed in Expressions (4) and (5), can be determined based on a geometric principle similar to the case of a 3-dimensional space. This scheme is appropriate for a case in which data (for example, point cloud data) obtained by projecting detection points in a 3-dimensional space to the set horizontal plane rather than the above-described 3-dimensional data set is acquired from the LIDAR 10.

$$r\# = r \cos(90° - \theta) \quad (4)$$

$$r2\# = r2 \times \cos(90° - \theta) \quad (5)$$

The 3-dimensional object recognizer 130 recognizes a 3-dimensional object which is around the vehicle M based on a detected detection point (a non-road surface point) determined not to be a road surface by the road surface determiner 120. The 3-dimensional object recognizer 130 recognizes a collection of the non-road surface points close to some extent as a 3-dimensional object and further recognizes a kind of 3-dimensinal object based on the size of the 3-dimensional object, reflection intensity, or the like.

Figure 7:
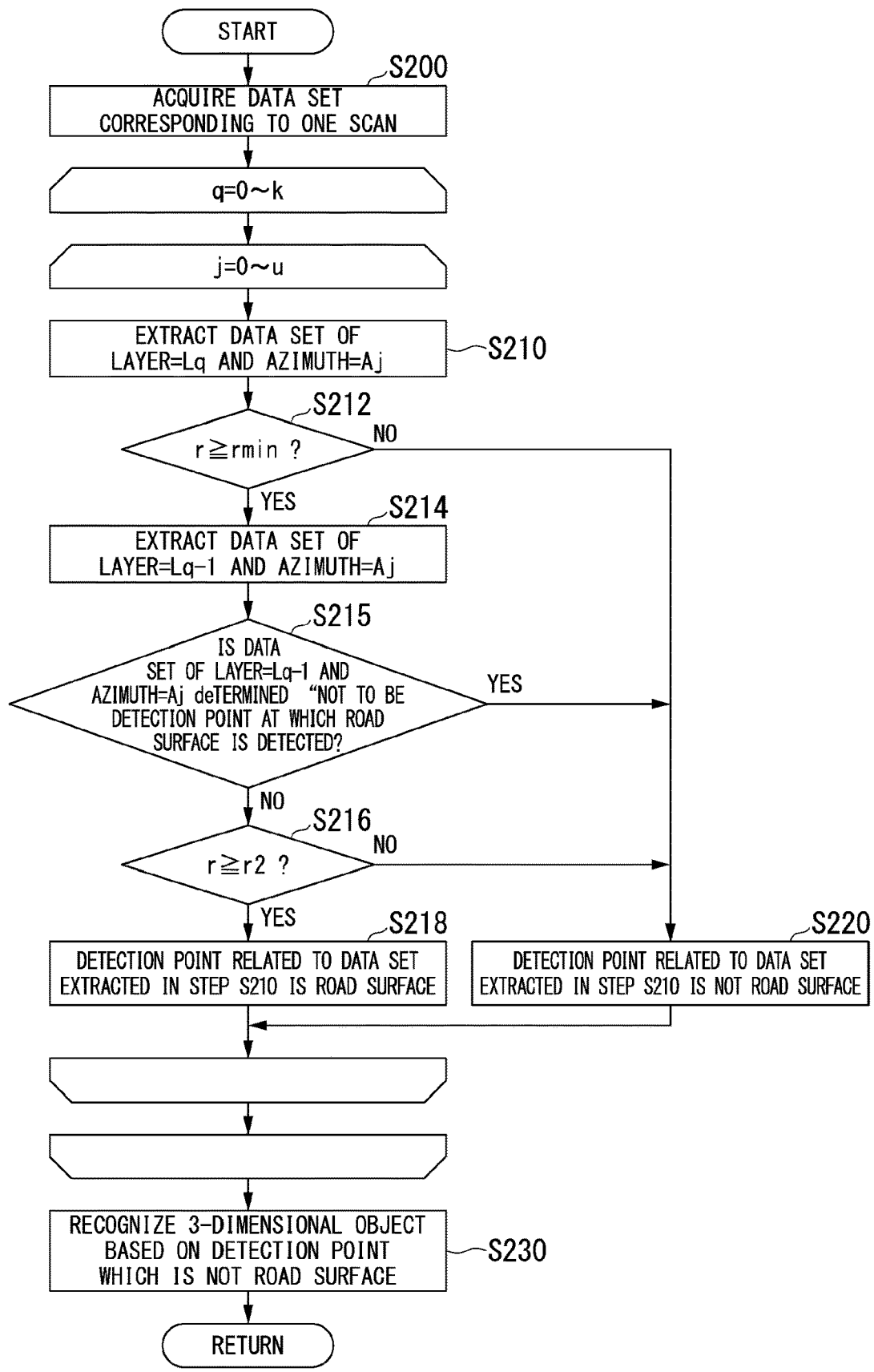
FIG. 7 is a flowchart illustrating an example of a flow of a process performed by the recognition device.

FIG. 7 is a flowchart illustrating an example of a flow of a process performed by the recognition device 100. First, the acquirer 110 acquires a data set corresponding to one scan (step S200).

Subsequently, the road surface determiner 120 performs processes of steps S210 to S220 from 0 to k for a parameter q indicating a layer and until 0 to u for a parameter j indicating an azimuth. The road surface determiner 120 performs the processes on the layers in an order in which the parameter q is smaller (an ascending order).

First, the first determiner 122 extracts a data set of layer=Lq and azimuth=Aj (step S210) and determines whether the distance r between the LIDAR 10 and a point of interest related to the data set is equal to or greater than the distance lower limit rmin (step S212). When the distance r to the point of interest is less than the distance lower limit rmin, the first determiner 122 determines that the detection point (the point of interest) related to the data set extracted in step S210 is not the detection point at which the road surface is detected (step S220).

When it is determined in step S212 that the distance r to the point of interest is equal to or greater than the distance lower limit rmin, the second determiner 124 extracts the data set of layer=Lq−1 and azimuth=Aj (step S214) and determines whether the data set of layer=Lq−1 and azimuth−Aj is "not the detection point at which the road surface is detected" (step S215). When it is determined that the data set of layer=Lq−1 and azimuth=Aj is "not the detection point at which the road surface is detected," the second determiner 124 determines that the detection point (the point of interest) related to the data set extracted in step S210 is not the detection point at which the road surface is detected (step S220).

When the data set of layer=Lq−1 and azimuth=Aj is determined to be "the detection point at which the road surface is detected," the second determiner 124 determines whether the distance r to the point of interest is equal to or greater than the reference distance r2 (step S216). When the distance r to the point of interest is less than the reference distance r2, the second determiner 124 determines that the detection point (the point of interest) related to the data set extracted in step S210 is not the detection point at which the road surface is detected (step S220). Conversely, when the distance r to the point of interest is equal to or greater than the reference distance r2, the second determiner 124 determines that the detection point (the point of interest) related to the data set extracted in step S210 is the detection point at which the road surface is detected (step S218). When q=0, there is no layer L−1. Therefore, the processes of steps S214 to S216 are skipped.

When the foregoing process ends, the 3-dimensional object recognizer 130 recognizes a 3-dimensional object which is around the vehicle M based on the detection point (the non-road surface point) determined not to be the detection point at which the road surface is detected (step S230).

Recognition of a white line has not been mentioned above. However, when a white line drawn on a road is a detection point, the detection point is determined to be a road surface. Accordingly, the recognition device 100 may have a function of recognizing a white line based on reflection intensity with regard to a detection point determined to be a road surface.

The recognition device 100 according to the above-described first embodiment can reduce a processing load while maintaining accuracy.

In the first embodiment, only one of the first determiner 122 and the second determiner 124 may be included. In this case, one of the determination process of step S212 and the processes of steps S214 to S216 in the flowchart of FIG. 7 is omitted. In a case in which only the first determiner 122 is included, the first determiner 122 determines that a point of interest is a detection point at which the road surface is detected when the distance r to the point of interest is equal to or greater than the distance lower limit rmin.

Second Embodiment

Hereinafter, a second embodiment will be described. A recognition device according to the second embodiment (which is referred to as a recognition device 100A although not particularly illustrated) is different from that of the first embodiment in the function of the second determiner 124. Hereinafter, a second determiner according to the second embodiment is referred to as a second determiner 124A.

Figure 8:
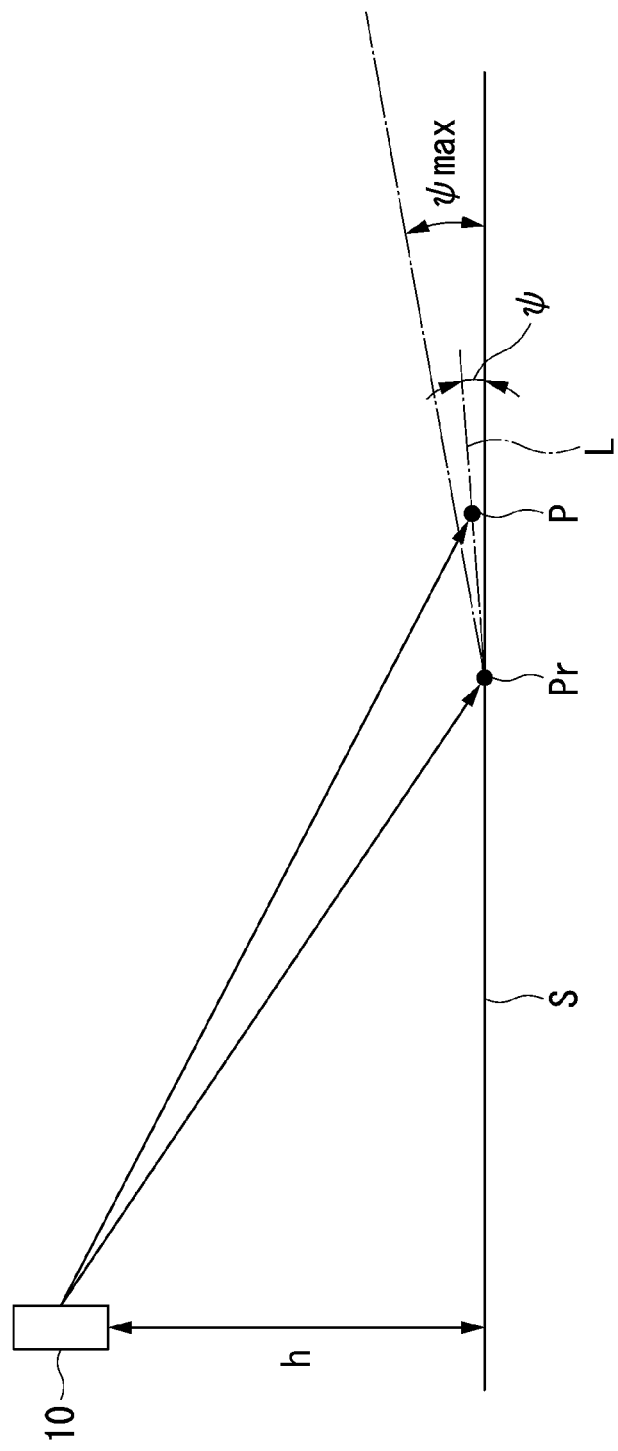
FIG. 8 is a diagram illustrating principle of a process performed by a second determiner.

FIG. 8 is a diagram illustrating principle of a process performed by the second determiner 124A. The second determiner 124A determines when the point of interest P is a detection point at which a road surface is detected when an angle ψ formed with respect to a set horizontal plane S of a straight line L connecting the point of interest P to the reference point Pr is equal to or less than the set road surface gradient ψmax. The process is geometrically equivalent to that of the first embodiment, but a calculation procedure is different from that of the first embodiment.

The flowchart of FIG. 7 may be cited as a flowchart and the determination process of step S216 may be replaced with a process of "determining that the angle ψ is equal to or less than the set road surface gradient ψmax."

The recognition device 100A according to the above-described second embodiment can reduce a processing load while maintaining accuracy as in the first embodiment.

In the second embodiment, only one of the first determiner 122 and the second determiner 124A may be included.

Third Embodiment

Hereinafter, a third embodiment will be described. In the third embodiment, the recognition device (100 or 100A) configures a vehicle control device along with an output destination device 200. Here, a device equivalent to the output destination device 200 is assumed to be a control device that performs automated driving.

Figure 9:
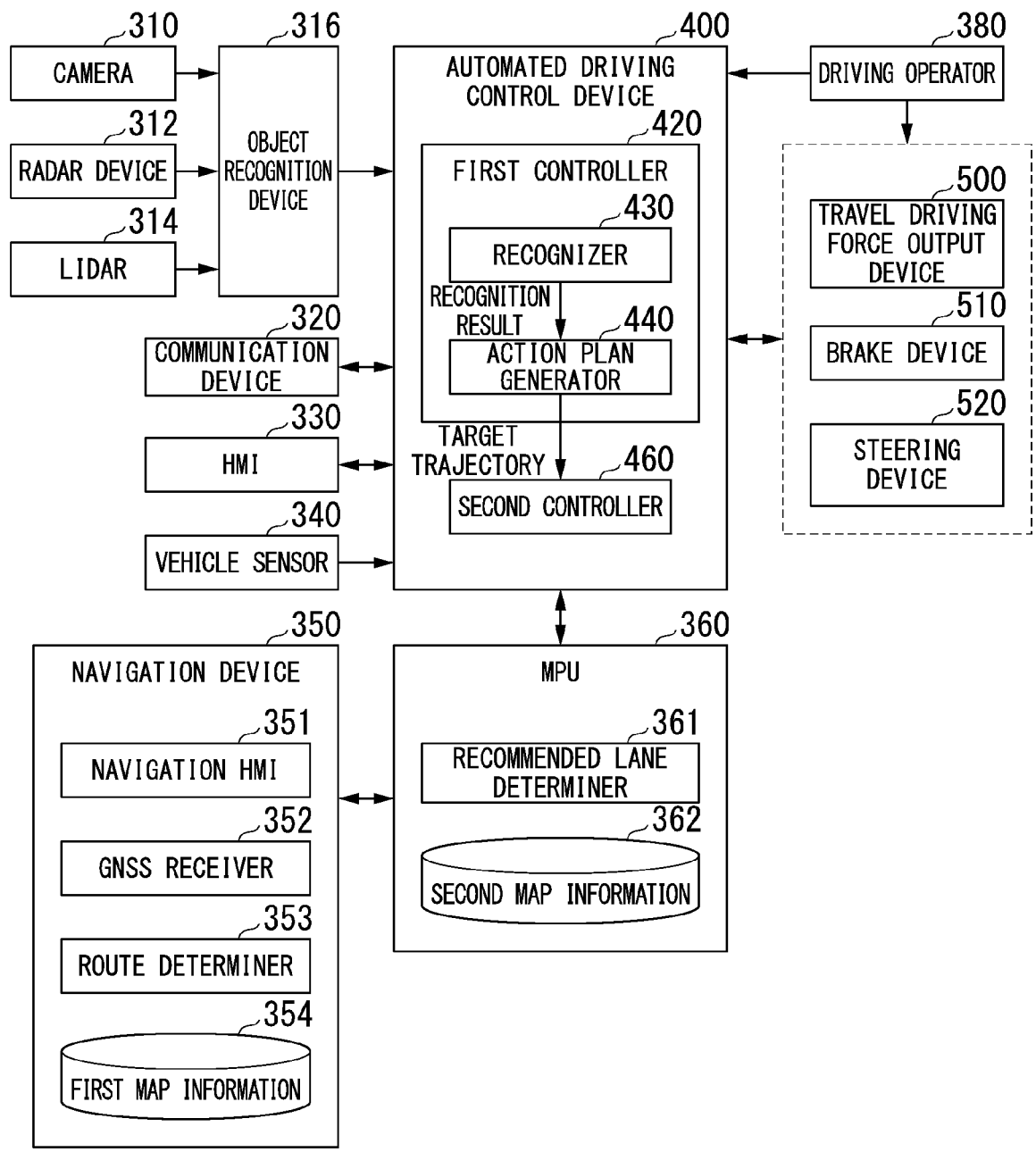
FIG. 9 is a diagram illustrating a configuration or the like of an automated driving control device in which the recognition device is used.

FIG. 9 is a diagram illustrating a configuration or the like of the automated driving control device 400 in which the recognition device is used. The configuration illustrated in the drawing is mounted on a vehicle. The vehicle M includes, for example, a camera 310, a radar device 312, a LIDAR 314, an object recognition device 316, a communication device 320, a human machine interface (HMI) 330, a vehicle sensor 340, a navigation device 350, a map positioning unit (MPU) 360, a driving operator 380, an automated driving control device 400, a travel driving force output device 500, a brake device 510, and a steering device 520. The devices and units are connected to one another via a multiplex communication line such as a controller area network (CAN) communication line, a serial communication line, or a wireless communication network. The configuration shown in FIG. 9 is merely exemplary, a part of the configuration may be omitted, and another configuration may be further added. In the configuration illustrated in FIG. 9, the object recognition device 316 or the recognizer 430 has similar functions to those of the recognition device described in the first or second embodiment.

The camera 310 images the surroundings of the vehicle M. The radar device 312 radiates radio waves such as millimeter waves to the surroundings of the vehicle M and detects radio waves (reflected waves) reflected from an object to detect at least a position (a distance and an azimuth) of the object. The radar device 312 is mounted on any portion of the vehicle M. The LIDAR 314 is similar to the LIDAR 10 in the first or second embodiment.

The object recognition device 316 performs a sensor fusion process on detection results from some or all of the camera 310, the radar device 312, and the LIDAR 314 and recognizes a position, a type, a speed, and the like of an object. The object recognition device 316 outputs a recognition result to the automated driving control device 400. The object recognition device 316 may output detection results of the camera 310, the radar device 312, and the LIDAR 314 to the automated driving control device 400 without any change. The object recognition device 316 may be omitted.

For example, the communication device 320 communicates with other vehicles around the vehicle M or communicates with various server devices via a wireless base station. The HMI 330 presents various types of information to occupants of the vehicle M and receives input operations by the occupants. The HMI 330 includes various display devices, speakers, buzzers, touch panels, switches, and keys. The vehicle sensor 340 includes a vehicle speed sensor that detects a speed of the vehicle M, an acceleration sensor that detects an acceleration, a yaw rate sensor that detects angular velocity around a vertical axis, and an azimuth sensor that detects a direction of the vehicle M.

The navigation device 350 includes, for example, a global navigation satellite system (GNSS) receiver 351, a navigation HMI 352, and a route determiner 353. The navigation device 350 retains first map information 354 in a storage device such as an HDD or a flash memory. The GNSS receiver 351 specifies a position of the vehicle M based on signals received from GNSS satellites. The position of the vehicle M may be specified or complemented by an inertial navigation system (INS) using an output of the vehicle sensor 340. The navigation HMI 352 includes a display device, a speaker, a touch panel, and a key. The route determiner 353 determines, for example, a route from a position of the vehicle M specified by the GNSS receiver 351 (or any input position) to a destination input by an occupant using the navigation HMI 352 (hereinafter referred to as a route on a map) with reference to the first map information 354. The route on the map is output to the MPU 360. The navigation device 350 may perform route guidance using the navigation HMI 352 based on the route on the map. The navigation device 350 may be realized by, for example, a function of a terminal device such as a smartphone or a tablet terminal carried by an occupant. The navigation device 350 may transmit a present position and a destination to a navigation server via the communication device 320 to acquire the same route as the route on the map from the navigation server.

The MPU 360 includes, for example, a recommended lane determiner 361 and retains second map information 362 in a storage device such as an HDD or a flash memory. The recommended lane determiner 361 divides the route on the map provided from the navigation device 350 into a plurality of blocks (for example, divides the route in a vehicle movement direction for each 100 [m]) and determines a recommended lane for each block with reference to the second map information 362. When there is a branching location in the route on the map, the recommended lane determiner 361 determines a recommended lane so that the vehicle M can travel in a reasonable route to move to a branching destination. The second map information 362 is map information that has higher precision than the first map information 354.

The driving operator 380 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 380 and a detection result is output to the automated driving control device 400 or some or all of the travel driving force output device 500, the brake device 510, and the steering device 520.

The automated driving control device 400 includes, for example, a first controller 420 and a second controller 460. Each of the first controller 420 and the second controller 460 is realized, for example, by causing a hardware processor such as a central processing unit (CPU) to execute a program (software). Some or all of the constituent elements may be realized by hardware (a circuit unit including circuitry) such as an LSI, an ASIC, an FPGA, or a GPU or may be realized by software and hardware in cooperation. The program may be stored in advance in a storage device (a storage device including a non-transitory storage medium) such as an HDD or a flash memory of the automated driving control device 400 or may be stored in a detachably mounted storage medium such as a DVD, a CD-ROM, or the like so that the storage medium (a non-transitory storage medium) is mounted on a drive device to be installed on the HDD or the flash memory of the automated driving control device 400.

The first controller 420 includes, for example, a recognizer 430 and an action plan generator 440. The first controller 420 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 430 recognizes a state such as a position, a speed, an acceleration of an object near the vehicle M based on information input from the camera 310, the radar device 312, and the LIDAR 314 via the object recognition device 316. For example, the position of the object is recognized as a position on the absolute coordinates in which a representative point (a center of gravity, a center of a driving shaft, or the like) of the vehicle M is the origin and is used for control. The position of the object may be represented as a representative point such as a center of gravity, a corner, or the like of the object or may be represented as expressed regions. A "state" of an object may include an acceleration or jerk of the object or an "action state" (for example, whether a vehicle is changing a lane or is attempting to change the lane).

The recognizer 430 recognizes, for example, a lane in which the vehicle M is traveling (a travel lane). For example, the recognizer 430 recognizes the travel lane by comparing patterns of road mark lines (for example, arrangement of solid lines and broken lines) obtained from the second map information 362 with patterns of road mark lines around the vehicle M recognized from images captured by the camera 310. The recognizer 430 may recognize a travel lane by mainly recognizing runway boundaries (road boundaries) including road mark lines or shoulders, curbstones, median strips, and guardrails without being limited to road mark lines. In this recognition, the position of the vehicle M acquired from the navigation device 350 or a process result by INS may be added. The recognizer 430 recognizes temporary stop lines, obstacles, red signals, toll gates, and other road events.

The recognizer 430 recognizes a position or a posture of the vehicle M with respect to the travel lane when the recognizer 430 recognizes the travel lane. For example, the recognizer 430 may recognize a deviation from the middle of a lane of a reference point of the vehicle M and an angle formed with a line extending along the middle of a lane in the travel direction of the vehicle M as a relative position and posture of the vehicle M to the travel lane. Instead of this, the recognizer 430 may recognize a position or the like of the reference point of the vehicle M with respect to a side end portion (a road mark line or a road boundary) of any travel lane as the relative position of the vehicle M to the travel lane.

In principle, the action plan generator 440 generates a target trajectory along which the vehicle M travels in future automatedly (irrespective of an operation or the like by a driver) so that the vehicle M can be traveling along a recommended lane determined by the recommended lane determiner 361 and surrounding situations of the vehicle M can be handled. The target trajectory includes, for example, a speed component. For example, the target trajectory is expressed by arranging spots (trajectory points) at which the vehicle M will arrive in sequence. The trajectory point is a spot at which the vehicle M will arrive for each predetermined traveling distance (for example, about several [m]) in a distance along a road. Apart from the trajectory points, a target acceleration and a target speed are generated as parts of the target trajectory for each of predetermined sampling times (for example, about every fraction of a second). The trajectory point may be a position at which the vehicle M will arrive at the sampling time for each predetermined sampling time. In this case, information regarding the target acceleration or the target speed is expressed according to an interval between the trajectory points.

The action plan generator 440 may set an automated driving event when the target trajectory is generated. As the automated driving event, there are a constant speed traveling event, a low-speed following traveling event, a lane changing event, a branching event, a joining event, a takeover event, and the like. The action plan generator 440 generates the target trajectory in accordance with an activated event.

The second controller 460 controls the travel driving force output device 500, the brake device 510, and the steering device 520 so that the vehicle M passes along the target trajectory generated by the action plan generator 440 at a scheduled time.

In this way, the action plan generator 440 controls a speed or steering of the vehicle based on the recognition result of the recognizer 430. Then, the action plan generator 440 generates a target trajectory based on whether a detection point of the LIDAR 314 determined by the object recognition device 316 or the recognizer 430 that has a similar function as that of the recognition device described in the first or second embodiment is a road surface. Thus, it is possible to generate the more appropriate target trajectory.

The foregoing embodiments can be expressed as follows.

A recognition device including:
a storage device storing a program and a hardware processor, the hardware processor executing the program stored in the storage device to perform:
to acquire a detection result including 3-dimensional positional information regarding detection points from an object detection sensor which is mounted in a vehicle and is capable of changing a detection direction of each of upper, lower, right, and left directions and; and
to determine whether a point of interest among the detection points is a detection point at which a road surface is detected, based on a relation between the point of interest and a reference point at which a detection direction of the upper and lower directions is further downward than at the point of interest.

The foregoing embodiments can also be expressed as follows.

A recognition device including:
a storage device storing a program and a hardware processor, the hardware processor executing the program stored in the storage device to perform:
to acquire a detection result including 3-dimensional positional information regarding detection points from an object detection sensor which is mounted in a vehicle and is capable of changing a detection direction of each of upper, lower, right, and left directions and; and
to determine that a point of interest is a detection point at which a road surface is detected when a distance between the object detection sensor and a point of interest included in the detection points is less than a distance lower limit determined based on the detection direction of the upper and lower directions of the point of interest, a set road surface gradient, and a position at which the object detection sensor is mounted.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A recognition device comprising:
an acquirer configured to be connected to an object detection sensor which is mounted in a vehicle and is capable of changing a detection direction of each of upper, lower, right, and left directions and to acquire a detection result including 3-dimensional positional information regarding detection points from the object detection sensor; and
a determiner configured to determine whether a point of interest among the detection points is a detection point at which a road surface is detected, based on a relation between the point of interest and a reference point at which a detection direction of the upper and lower directions is further downward than at the point of interest,
wherein the determiner
calculates a reference distance based on a distance between the object detection sensor and the reference point, a difference between the point of interest and the detection direction of the reference point, and a set road surface gradient,
determines that the point of interest is the detection point at which the road surface is detected when the distance between the object detection sensor and the point of interest is equal to or greater than the reference distance, and
determines that the point of interest is not the detection point at which the road surface is detected when the distance between the object detection sensor and the point of interest is less than the reference distance.

2. A recognition device comprising:
an acquirer configured to be connected to an object detection sensor which is mounted in a vehicle and is capable of changing a detection direction of each of upper, lower, right, and left directions and to acquire a detection result including 3-dimensional positional information regarding detection points from the object detection sensor; and
a determiner configured to determine whether a point of interest among the detection points is a detection point at which a road surface is detected, based on a relation between the point of interest and a reference point at which a detection direction of the upper and lower directions is further downward than at the point of interest,
wherein the determiner
determines that the point of interest is the detection point at which the road surface is detected when an angle formed with respect to a set horizontal plane of a straight line connecting the point of interest to the reference point is equal to or less than a set road surface gradient, and
determines that the point of interest is not the detection point at which the road surface is detected when the angle formed with respect to the set horizontal plane of the straight line connecting the point of interest to the reference point is greater than the set road surface gradient.

3. The recognition device according to claim 1, wherein the determiner treats a distance between the object detection sensor and the point of interest in a 3-dimensional space as the distance between the object detection sensor and the point of interest, and treats a distance between the object detection sensor and the reference point in a 3-dimensional space as the distance between the object detection sensor and the reference point.

4. The recognition device according to claim 1, wherein the determiner treats a distance between the object detection sensor and the point of interest in a 2-dimensional space projected from a 3-dimensional space between the object detection sensor and the point of interest as the distance between the object detection sensor and the point of interest, and treats a distance between the object detection sensor and the reference point in a 2-dimensional space projected from a 3-dimensional space as the distance between the object detection sensor and the reference point.

5. A recognition device comprising:

an acquirer configured to be connected to an object detection sensor which is mounted in a vehicle and is capable of changing a detection direction of each of upper, lower, right, and left directions and to acquire a detection result including 3-dimensional positional information regarding detection points from the object detection sensor; and a determiner configured to determine whether a point of interest among the detection points is a detection point at which a road surface is detected, based on a relation between the point of interest and a reference point at which a detection direction of the upper and lower directions is further downward than at the point of interest, wherein the determiner performs a first-stage determination process of determining that the point of interest is not the detection point at which the road surface is detected when the distance between the object detection sensor and the point of interest is less than a distance lower limit determined based on the detection direction of the upper and lower directions of the point of interest, the set road surface gradient, and a position at which the object detection sensor is mounted, and performs a second-stage determination process of determining whether the point of interest is the detection point at which the road surface is detected, based on a relation between the distance between the object detection sensor and the point of interest and the distance between the object detections sensor and the reference point when it is determined in the first-stage determination process that the point of interest is not the detection point at which the road surface is detected.

6. A method of causing a computer connected to an object detection sensor which is mounted in a vehicle and is capable of changing a detection direction of each of upper, lower, right, and left directions:

to acquire a detection result including 3-dimensional positional information regarding detection points from the object detection sensor; and to determine whether a point of interest among the detection points is a detection point at which a road surface is detected, based on a relation between the point of interest and a reference point at which a detection direction of the upper and lower directions is further downward than at the point of interest and to output a determination result, wherein the method further causes the computer to calculate a reference distance based on a distance between the object detection sensor and the reference point, a difference between the point of interest and the detection direction of the reference point, and a set road surface gradient, to determine that the point of interest is the detection point at which the road surface is detected when the distance between the object detection sensor and the point of interest is equal to or greater than the reference distance, and to determine that the point of interest is not the detection point at which the road surface is detected when the distance between the object detection sensor and the point of interest is less than the reference distance.

* * * * *